United States Patent
Jang et al.

(10) Patent No.: US 8,689,217 B2
(45) Date of Patent: Apr. 1, 2014

(54) SYSTEM AND METHOD FOR THREAD PROCESSING ROBOT SOFTWARE COMPONENTS RESPONSIVE TO PERIODIC, DEDICATED, AND PASSIVE MODES

(75) Inventors: Choul Soo Jang, Daejeon (KR); Seung-Woog Jung, Daejeon (KR); Byoung Youl Song, Daejeon (KR); Sung Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1145 days.

(21) Appl. No.: 12/494,819

(22) Filed: Jun. 30, 2009

(65) Prior Publication Data

US 2010/0115524 A1      May 6, 2010

(30) Foreign Application Priority Data

Oct. 31, 2008   (KR) .................. 10-2008-0107778
Mar. 19, 2009   (KR) .................. 10-2009-0023617

(51) Int. Cl.
*G06F 9/455*   (2006.01)
*G06F 9/46*    (2006.01)

(52) U.S. Cl.
USPC .......................................... 718/100; 718/102

(58) Field of Classification Search
None
See application file for complete search history.

(56) References Cited

U.S. PATENT DOCUMENTS

| | | | |
|---|---|---|---|
| 6,301,634 B1 | 10/2001 | Gomi et al. | |
| 7,765,547 B2 * | 7/2010 | Cismas et al. | 718/100 |
| 2003/0204552 A1 * | 10/2003 | Zuberi | 709/103 |
| 2004/0216106 A1 * | 10/2004 | Kalla et al. | 718/100 |
| 2005/0010925 A1 | 1/2005 | Khawand et al. | |
| 2005/0097556 A1 * | 5/2005 | Code et al. | 718/102 |
| 2006/0012603 A1 | 1/2006 | Lindholm et al. | |
| 2006/0101224 A1 * | 5/2006 | Shah et al. | 711/173 |
| 2007/0079309 A1 * | 4/2007 | Schmidt et al. | 718/100 |
| 2007/0112463 A1 * | 5/2007 | Roh et al. | 700/245 |
| 2007/0150104 A1 * | 6/2007 | Jang et al. | 700/245 |
| 2007/0226742 A1 * | 9/2007 | Hung et al. | 718/103 |

(Continued)

FOREIGN PATENT DOCUMENTS

| | | |
|---|---|---|
| EP | 1 901 211 | 3/2008 |
| JP | 5-204672 | 8/1993 |

(Continued)

OTHER PUBLICATIONS

A Robot Component Container for Open Platform for Robotic Services (OPRoS), Choulsoo Jang et al., URAI 2008 the 5th International Conference on Ubiquitous Robots and Ambient Intelligence, Korea University, Seoul, Korea, Nov. 20-22, 2008.

*Primary Examiner* — Meng An
*Assistant Examiner* — Bradley Teets
(74) *Attorney, Agent, or Firm* — Staas & Halsey LLP (57) ABSTRACT

An apparatus for thread processing robot software components includes a data port unit for storing input data in a buffer and then processing the data in a periodic execution mode or in a dedicated execution mode; an event port unit for processing an input event in a passive execution mode; and a method port unit for processing an input method call in the passive execution mode by calling a user-defined method corresponding to the method call. In the periodic execution mode, the data is processed by using an execution thread according to a period of a corresponding component. In the dedicated execution mode, a dedicated thread for the data is created and the data is processed by using the dedicated thread.

18 Claims, 7 Drawing Sheets

(56) References Cited

U.S. PATENT DOCUMENTS

| | | | |
|---|---|---|---|
| 2007/0271404 A1* | 11/2007 | Dearth et al. | 710/302 |
| 2008/0109611 A1 | 5/2008 | Liu et al. | |
| 2008/0141220 A1 | 6/2008 | Kim et al. | |

FOREIGN PATENT DOCUMENTS

| | | |
|---|---|---|
| JP | 10-15836 | 1/1998 |
| JP | 2000-330821 | 11/2000 |
| JP | 2004-280299 | 10/2004 |
| JP | 2007-157166 | 6/2007 |
| JP | 2008-15585 | 1/2008 |
| KR | 10-2005-0108518 | 11/2005 |
| KR | 10-2006-0039433 | 5/2006 |
| KR | 10-2007-0030327 | 3/2007 |
| KR | 10-2008-0072335 | 8/2008 |
| KR | 10-2008-0073414 | 8/2008 |

* cited by examiner

```
<execution_semantics>

<type>periodic</type>
    <priority>5<priority>
    <period>100</period>

</execution_semantics>
```

```
while(state==RUNNING
{
onExecute();//EXECUTE ONE LOOP AND RETURN.
suspend();//CHANGE COMPONENT STATE FROM RUNNING-STATE TO SUSPENDED-STATE.
waitStatechanged();//WAIT FOR NEXT resume()
}
```

SYSTEM AND METHOD FOR THREAD PROCESSING ROBOT SOFTWARE COMPONENTS RESPONSIVE TO PERIODIC, DEDICATED, AND PASSIVE MODES

CROSS-REFERENCE(S) TO RELATED APPLICATION(S)

The present invention claims priority of Korean Patent Application No. 10-2008-0107778, filed on Oct. 31, 2008, and Korean Patent Application No. 10-2009-0023617, filed on Mar. 19, 2009, which are incorporated herein by reference.

FIELD OF THE INVENTION

The present invention relates to thread processing robot software components; and, more particularly, a system and method for thread processing robot software components via a component execution engine driving the robot software components.

BACKGROUND OF THE INVENTION

As well known in the art, robot systems become complicated as uses of robots expand from industries to home. Different from industrial robots having hardware and software architecture restricted to specific operations, home intelligent robots have sensors and motor actuators to carry out various tasks. Further, the intelligent robots have processing units, e.g., micro processors, controllers, DSPs (Digital Signal Processors) and SoCs (System on Chips), for controlling elements of the robots and performing communications with the outside. The processing units have distributed architecture connected via networks.

Robot software modules are executed on the processing units and exchange data and control with each other via communications. In order to efficiently control the robots having such complicatedly-entangled distributed architectures, efficient control software architecture is necessary that can integratedly and harmoniously process various tasks simultaneously happened at nodes while efficiently using limited resources of the robots.

Robot software components, which are reusable and replaceable software modules capable of being accessed via interfaces provided thereby, performs functions of the robot software modules. Component users only use the interfaces without knowing details of the corresponding interfaces. That is, the components are black boxes having the interfaces open to the outside, which allows free modification of internal architectures of the components as long as the interfaces are not modified.

For the industrial robots, there are mainly two robot control patterns: a client/server pattern and a control loop pattern. In the client/server pattern, a method provided by a component is called to perform specific operations or read or modify attributes of the component. Examples of the client/server pattern are CORBA (Common Object Request Broker Architecture), RMI (Remote Method Invocation) and RPC (Remote Procedure Call).

In the control loop pattern, samely as in typical control loops, data or event is periodically exchanged between components in a robot and a component performs a task by processing sensor data based on a state of the component to drive actuators of the robot. An example of the control loop pattern is JAUS (Joint Architecture for Unmanned System) which is mounted on unmanned vehicles and forms a control loop for periodically exchanging data having a specific data format between the components.

Meanwhile, since the home intelligent robots have much more complicated architecture and perform more various functions than those of the industrial robots, it is efficient to use both of the above-described robot control patterns for more flexible home intelligent robot control.

Therefore, robot software components need to operate actively while having therein FSMs (Finite State Machines) and be controlled via exchanging data with each other and calling a method. Recently proposed robot programming methods using such actively operating components are, e.g., OROCOS (Open Robot Control System) and RTC (Robot Technology Component).

Robot applications are combinations of the components, and, in order to decrease coupling degrees between the components, using of the components via ports is recommended. The ports connect the components and allow the components to communicate with each other.

However, though the ports are used, if too many threads are used in processing a number of components operating independently, system resources are wasted and information delivery between the threads are retarded, which causes decrease in efficiency of the system.

SUMMARY OF THE INVENTION

In view of the above, the present invention provides a system and method for thread processing robot software components, in which configuration of threads executing a component is changed according to a port type of the component, thereby preventing waste of system resources and improving system efficiency.

In accordance with an aspect of the present invention, there is provided an apparatus for thread processing robot software components, the apparatus including:

a data port unit for storing input data in a buffer and then processing the data in a periodic execution mode, in which the data is processed by using an execution thread according to a period of a corresponding component, or in a dedicated execution mode, in which a dedicated thread for the data is created and the data is processed by using the dedicated thread;

an event port unit for processing an input event in a passive execution mode; and a method port unit for processing an input method call in the passive execution mode by calling a user-defined method corresponding to the method call.

Preferably, for the period execution mode, the period and a priority of the corresponding component are set in component setting information.

Preferably, in the period execution mode, components having an identical period and an identical priority are processed by using a single thread.

Preferably, in the period execution mode, components having an identical period but different priorities are sequentially processed in an order of the priorities by using a single thread.

Preferably, in the dedicated execution mode, the dedicated thread is suspended after executed for one time, and then re-executed when a resume method is called.

Preferably, in the passive execution mode, the event is processed by using a finite state machine.

Preferably, in the passive execution mode, a new thread for the event is created and the event is processed by using the new thread.

Preferably, in the passive execution mode, a new thread for the method call is created and the method call is processed by using the new thread.

In accordance with another aspect of the present invention, there is provided a method for thread processing robot software components, the method including:

communicating with outside via a data port, an event port and a method port;

processing data received via the data port in a periodic execution mode or in a dedicated execution mode;

processing an event received via the event port in a passive execution mode; and processing a method call received via the method port in the passive execution mode.

Preferably, in said processing the data in the periodic execution mode, the data is processed by using an execution thread according to a period of a corresponding component.

Preferably, for the periodic execution mode, the period and a priority of the corresponding component are set in component setting information.

Preferably, in said processing the data in the period execution mode, components having an identical period and an identical priority are processed by using a single thread.

Preferably, in said processing the data in the periodic execution mode, components having an identical period are sorted in an order of priorities and sequentially processed in the order of the priorities by using a single thread.

Preferably, in said processing the data in the periodic execution mode, an error is reported if the execution thread fails to process the data according to the period of the corresponding component.

Preferably, in said processing the data in the dedicated execution mode, a dedicated thread for the data is created and the data is processed by using the dedicated thread; and wherein the dedicated thread is suspended after executed for one time, and then re-executed when a resume method is called.

Preferably, in said processing the data in the dedicated execution mode, the dedicated thread is suspended and waits for the resume method call by using a mutual exclusion object.

Preferably, in said processing the event in the passive execution mode, the event is processed by using a finite state machine.

Preferably, in said processing the event in the passive execution mode, a new thread for the event is created and the event is processed by using the new thread.

Preferably, in said processing the method call in the passive mode, a user-defined method corresponding to the method call is called to process the method call.

Preferably, in said processing the method call in the passive mode, a new thread for the method call is created and the method call is processed by using the new thread.

According to the present invention, a component execution engine for driving weakly-coupled robot software components in distributed environment changes configuration of threads executing a component according to a port type of the component, which solves a problem in that too many threads are used in processing a number of components operating independently. Hence, waste of system resources and retardation of information delivery between the threads can be prevented, and decrease in efficiency of the system can be also prevented.

BRIEF DESCRIPTION OF THE DRAWINGS

The above features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings, which form a part hereof.

Figure 1:
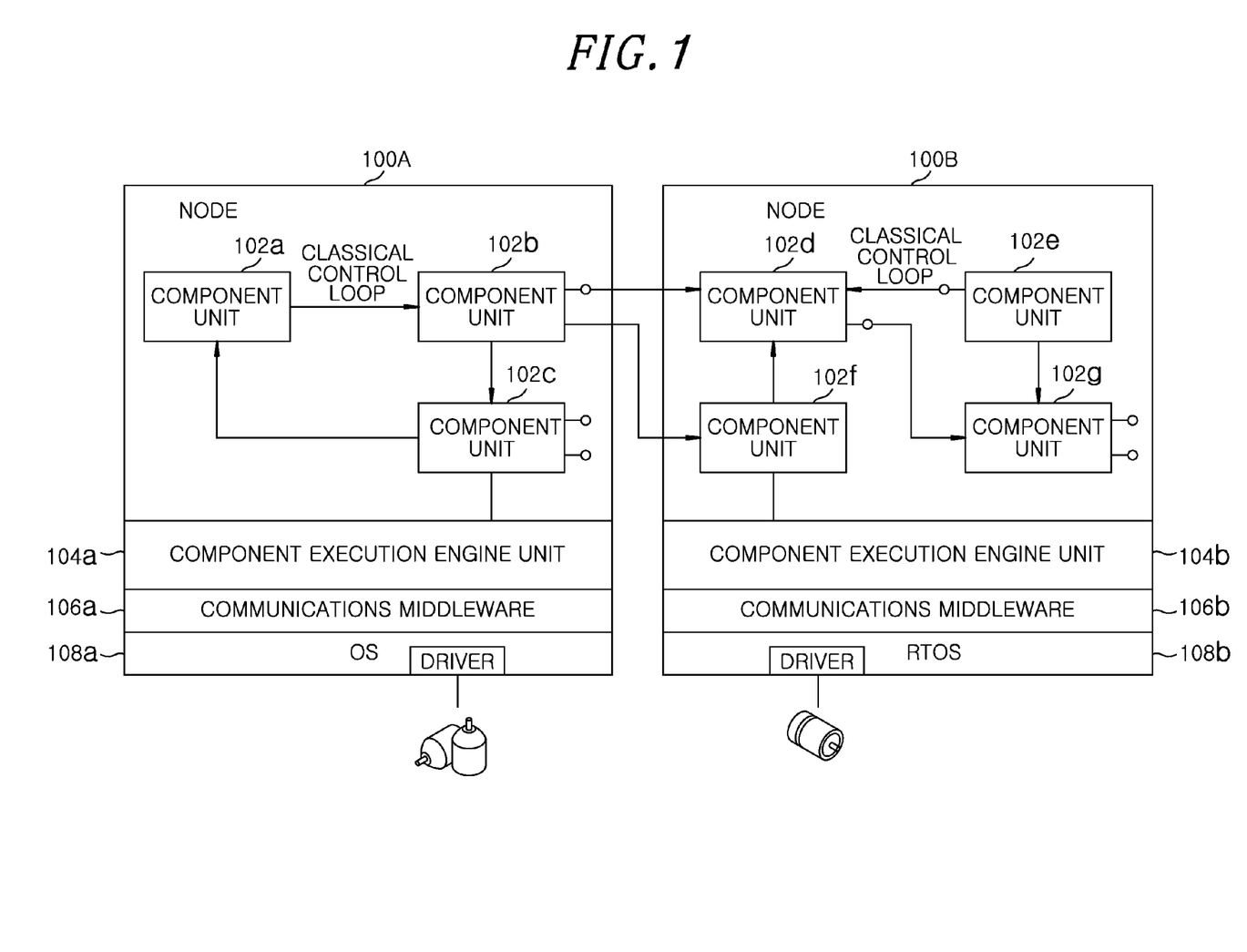
FIG. 1 illustrates an exemplary view of a robot system including two nodes each node having a component execution engine unit and component units.

FIG. 1 illustrates an exemplary view of a robot system including two nodes each node having a component execution engine unit and component units. A node 100A includes component units 102a, 102b and 102c, a component execution engine unit 104a, a communications middleware 106a and an operating system 108a. A node 100B includes component units 102d, 102e, 102f and 102g, a component execution engine unit 104b, a communications middleware 106b and an operating system 108b.

Each of the component units 102a to 102g, which correspond to robot software components and interconnected with each other to configure the robot system, operates not by itself but under control of the component execution engine units 104a and 104b. The component execution engine units 104a and 104b operate on the operating systems 108a and 108b and the communications middlewares 106a and 106b, e.g., CORBA. The nodes A and B have the component execution engine units 104a and 104b, respectively, so that the component execution engine unit 104a drives the component units 102a to 102c in the node A while the component execution engine unit 104b drives the component units 102d to 102g in the node B.

Below, a thread processing system for thread processing data, events and methods in the robot system having the above-described configuration will be described with reference to FIGS. 2 to 4.

Figure 2:
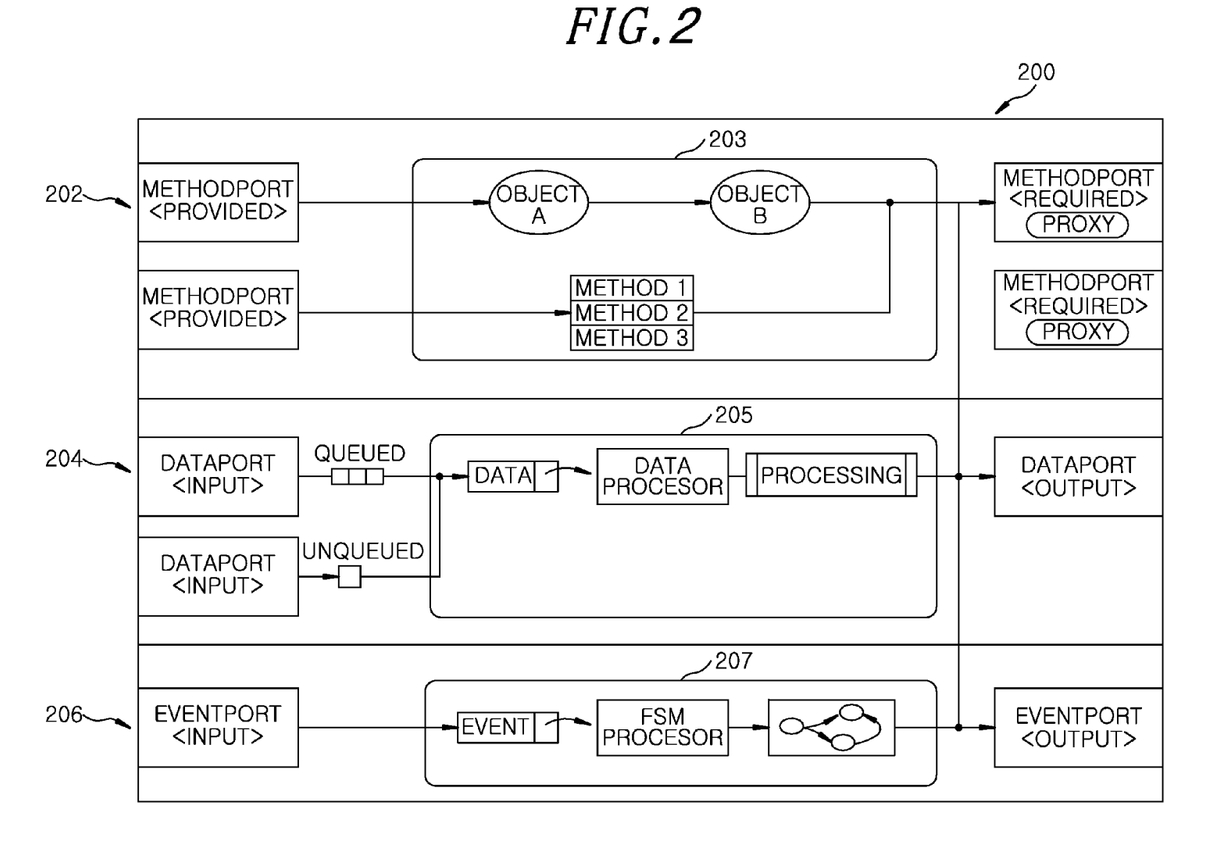
FIG. 2 illustrates a component unit for thread processing by ports in accordance with the present invention.

FIG. 2 illustrates a component unit 200 for thread processing by ports in accordance with the present invention.

The component unit 200 includes a method port unit 202 for calling methods of corresponding component, a data port unit 204 for exchanging data with other component units and an event port unit 206 for notifying occurrence of events to the component unit. That is, the component unit 200 performs communications with other component units by using the method port unit 202, the data port unit 204 and the event port unit 206.

Execution mode of the component unit 200 is classified into a periodic execution mode, a dedicated execution mode and a passive execution mode. The data port unit 204 operates in the periodic execution mode or the dedicated execution mode, while the method port unit 202 and the event port unit 206 operate in the passive execution mode. Details of these execution modes will be described later.

In the periodic execution mode, if data is input from a component execution engine unit to the data port unit 204, the input data is temporarily stored (queued) in a buffer (shown as a queue in FIG. 2). Then, when an execution method for the periodic execution mode, e.g., onExecute( ), is called according to a specific period, the data temporarily stored in the buffer is processed in a processing unit 205 in the data port unit 204 by using the called execution method.

In the dedicated execution mode, when a corresponding component initially starts, a state of the component is changed from "READY" to "RUNNING", and an execution method, e.g., onExecute( ), is executed for one time by a dedicated thread. Then, the state of the component is changed to "SUSPENDED" waiting for a next start by using a mutex (mutual exclusion object). If a resume method, e.g., resume( ), call is requested via the method port unit 202 during the "SUSPENDED" state, the state of the component is changed from "SUSPENDED" to "RUNNING". Then the processing unit 205 calls the dedicated thread by using the mutex to call again the execution method, e.g, onExecute( ) and processes data by using the called execution method.

In the passive execution mode, if a method request is provided to the method port unit 202 from the component execution engine unit, a processing unit 203 in the method port unit 202 calls a user-defined method, e.g., userDefinedMethod( ), and passively (without allocating a separate thread) processes the requested method by using the user-defined method.

In the passive execution mode, if an event is provided to the event port unit 206 from the component execution engine unit, a processing unit 207 in the event port unit 206 processes the event by using FSM in the processing unit 207 immediately (without buffering).

In the above, the method port unit 202, the data port unit 204 and the event port unit 206 have therein the processing unit 203, the processing unit 205 and the processing unit 207, respectively. However, it should be noted that the method port unit 202, the data port unit 204 and the event port unit 206 may have a common processing unit instead of the respective processing units 203, 205 and 207. Further, each component unit may have, if necessary, multiple method port units 202, data port units 204 and a event port units 208.

Figure 3:
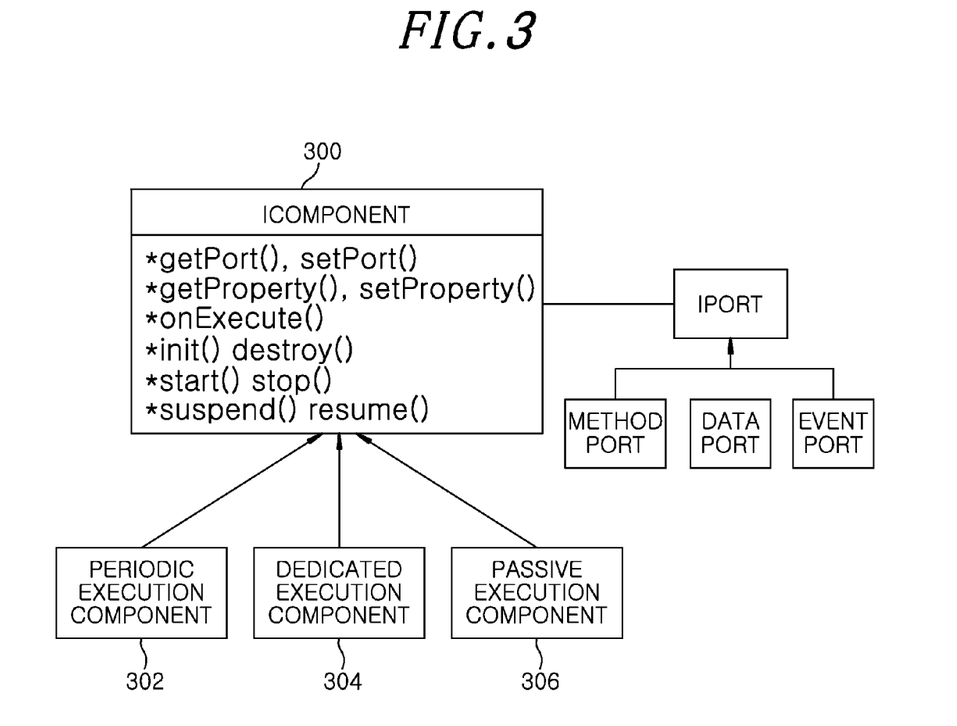
FIG. 3 illustrates a component class diagram classified according to an execution mode of a component.
Figure 4:
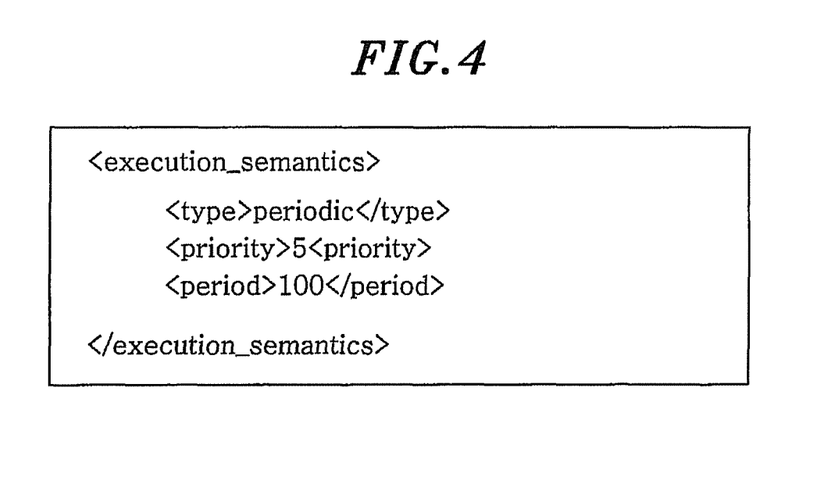
FIG. 4 illustrates an exemplary component setting information of a periodic execution component.

FIG. 3 illustrates a component class diagram classified according to an execution mode of a component unit, i.e., an execution mode of a component. A robot software component is classified based on the execution mode thereof into one of a periodic execution component 302, a dedicated execution component 304 and a passive execution component 306, which are subclasses of an IComponent 300 having a number of methods. Class information of a component may be written in an XML (Extensible Mark-up Language) file when the component is created.

A robot software component is created as follows. First, a parent class of the component is selected based on the execution mode of the component among the periodic execution component 302, the dedicated execution component 304 and the passive execution component 306, and template codes inherited from the parent class are generated. Then, user-defined codes are added to the generated template codes and the template codes to which the user-defined codes are added are compiled to create the component. Thus created component may be hardware-implemented as the component unit, and executed by a component execution engine hardware-implemented as the component execution engine unit according to the execution mode thereof.

The periodic execution mode is used in processing data or perform algorithm periodically, as in the classical control loop. Such control loop may be used for controlling lower level devices. In order for periodic processing on data, the component execution engine may periodically call a particular execution method of the component, e.g., onExecute( ), to sequentially process data received via a data port 310 hardware-implemented as the data port unit 204.

For a component to the executed in the periodic execution mode, an execution period and a priority need to be set in component setting information, e.g., described in XML. The priority is to process, when multiple components need to be executed together, the components in the order of priorities thereof. That is, the component execution engine may allocate a thread to a component having the highest priority to execute the component, and then allocate the thread to a component having the next highest priority. FIG. 4 illustrates an exemplary component setting information of a periodic execution component. As shown in FIG. 4, an execution period and a priority of a component may be set in the component setting information of the component by using XML.

Below, a thread processing procedure on data will be described with reference to FIGS. 5 to 7.

Figure 5:
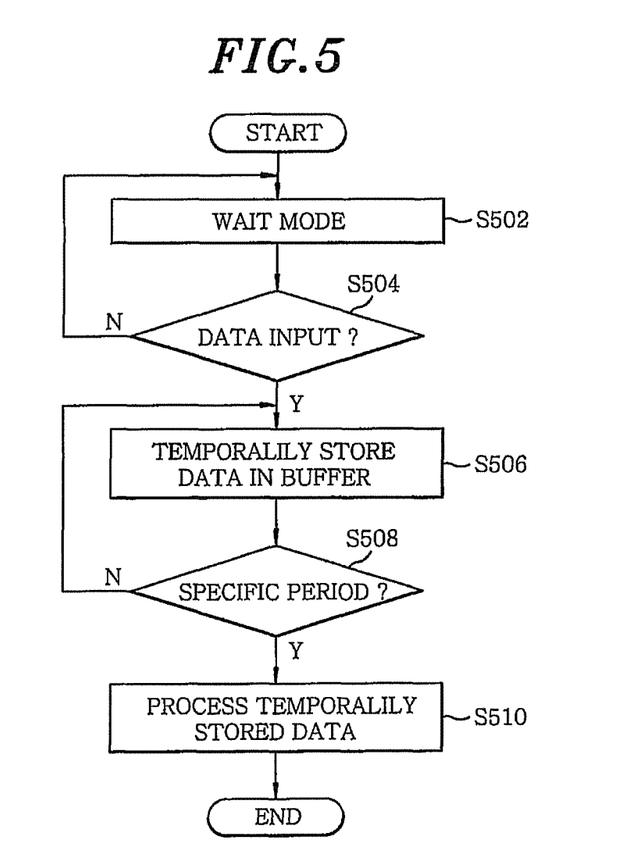
FIG. 5 illustrates a flowchart of a thread processing procedure on data in a periodic execution mode.

FIG. 5 illustrates a flowchart of a thread processing procedure on data in a periodic execution mode.

First, a robot software component is set to be a wait mode (step S502). During the wait mode, a thread for receiving data from the outside (hereinafter, referred to as "reception thread") of a component execution engine checks whether data is input from the outside (step S504).

If it is determined in the step S504 that data is input from the outside, the reception thread temporarily stores the input data in a buffer via a data port of the component (step S506).

Thereafter, a thread for periodic execution (hereinafter, referred to as "periodic execution thread") of the component execution engine checks whether a specific period has elapsed (step S508).

If it is determined in the step S508 that the specific period has elapsed, the periodic execution thread calls an execution method for the periodic execution mode, e.g., onExecute( ), and process the buffered data via a processing unit of the component (step S510).

Here, the component execution engine sequentially executes components having identical execution periods via single thread in the order of priorities thereof, to prevent a waste of system resources. Therefore, waste of system resources can be prevented and a thread context switching time, which is necessary when multiple thread are used, can be reduces, thereby improving performance of the robot system.

In order to maximize performance improvement of the robot system, execution methods to be called periodically need to be returned as fast as possible and prevented from calling a blocked function. If the execution methods to be called periodically cannot be called according to an execution period of a component, the component execution engine may report an error.

Meanwhile, if a certain component among components executed via a same thread has a very long execution time or calls a blocked function, execution of the rest components may be delayed or cannot be executed. Thus, for a component having a long or unpredictable execution time, the dedicated execution mode can be used instead of the periodic execution mode.

Figure 6:
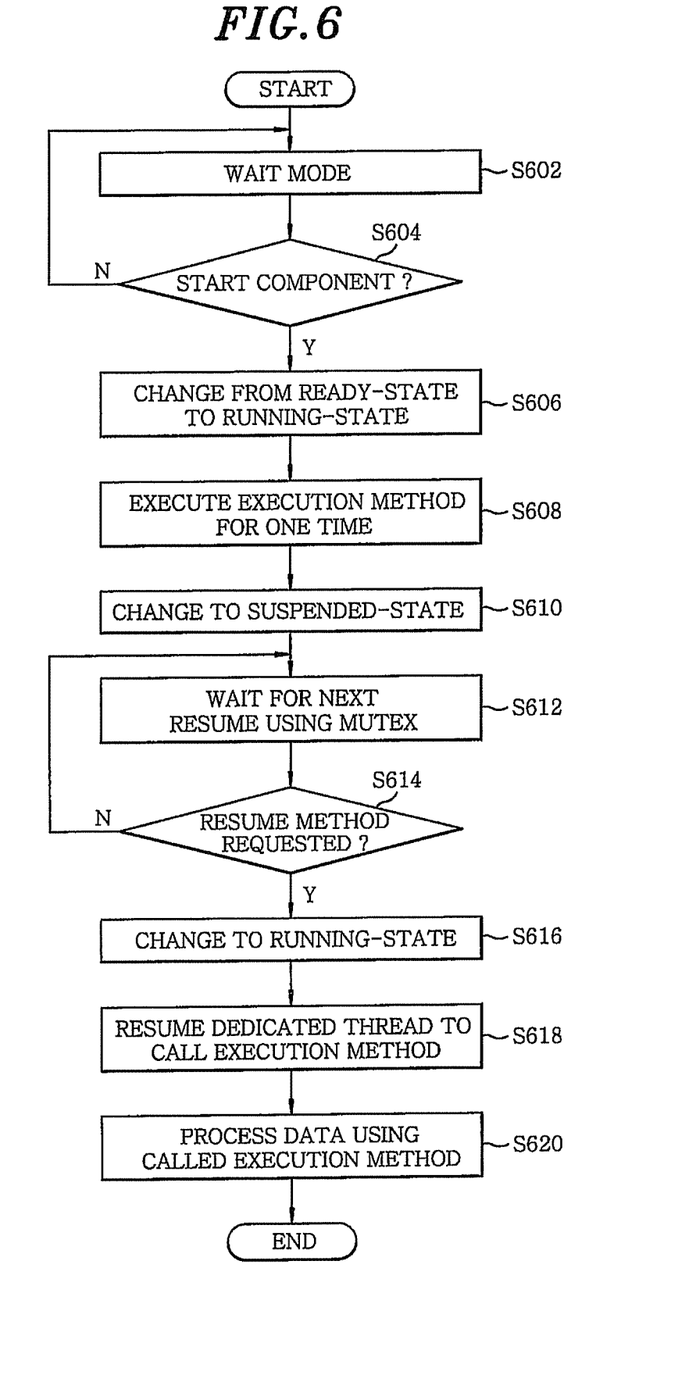
FIG. 6 illustrates a flowchart of a thread processing procedure on data in a dedicated execution mode.
Figure 7:
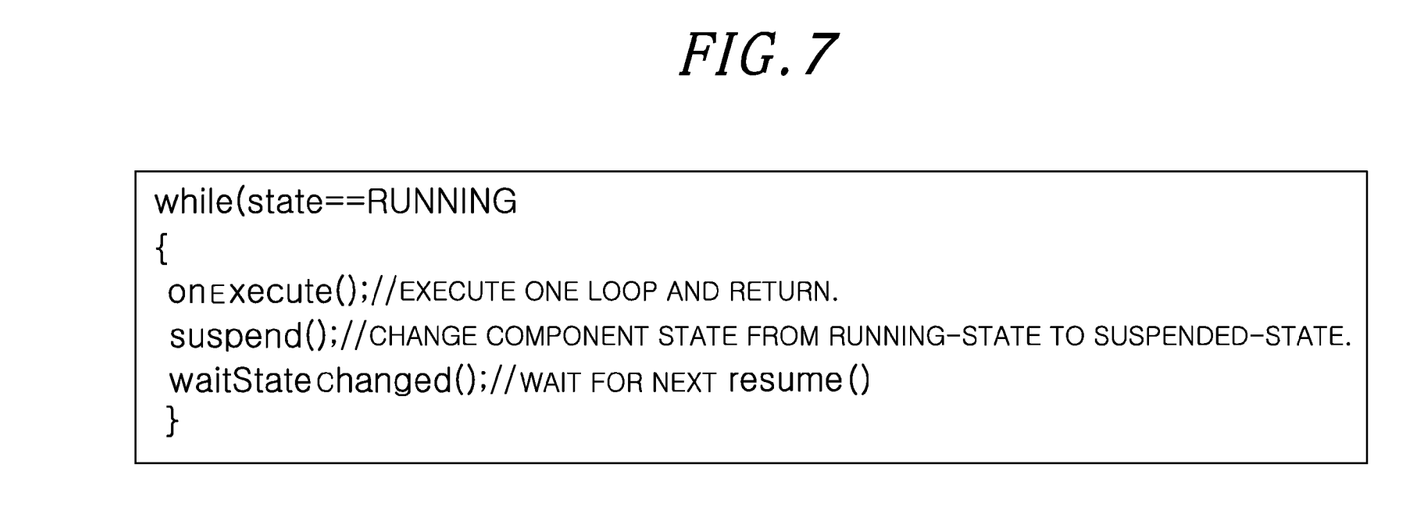
FIG. 7 illustrates exemplary codes for waiting for a next start of a component after executing an execution method.

FIG. 6 illustrates a flowchart of a thread processing procedure on data in a dedicated execution mode.

First, a robot software component is set to be a wait mode (step S602). During the wait mode, a thread dedicated to a processing unit of the component (hereinafter, referred to as "dedicated thread") checks whether the component is initially started, e.g., via a method start( ) (step S604).

If it is determined in the step S604 that the component is initially started, the dedicated thread changes a state of the component from "READY" to "RUNNING" (step S606). Then, the dedicated thread executes an execution method, e.g., onExecute( ), for one time via the processing unit of the component (step S608).

Thereafter, the dedicated thread changes the state of the component to "SUSPENDED" (step S610). Further, the dedicated thread waits for a next start of the component by using a mutex (step S612). FIG. 7 illustrates exemplary codes for waiting for a next start of a component after executing an execution method.

Referring back to FIG. 6, the reception thread of the component execution engine checks whether calling a resume method, e.g., resume( ), is requested from the outside (step S614).

If it is determined in the step S614 that the resume method is requested, the request is delivered to the processing unit of the component via the method port, and then the processing unit changes the state of the component from "SUSPENDED" to "RUNNING" (step S616).

Thereafter, the processing unit resumes the dedicated thread by using the mutex to call again the execution method (step S618). The dedicated thread processes data by using the called execution method (step S620).

Meanwhile, if the reception thread of the component execution engine is requested from the outside to call a stop method, e.g., stop( ), the reception thread of the component execution engine delivers the request to the processing unit of the component via the method port. Then, the processing unit changes the state of the component to "STOPPED" and calls the dedicated thread via the mutex. The dedicated thread checks the state of the component, e.g., via a while statement. If it is determined that the state is not "RUNNING", the dedicated thread is terminated and the corresponding component may be destroyed.

While data is processed in the period execution mode or in the dedicated execution mode as described above, methods and events are processed in the passive execution mode. In the passive execution mode, a method or an event is processed not by the periodic execution thread of the component execution engine or the dedicated thread of the component, but by the reception thread which has received the method call request or the event from the outside.

That is, in the passive execution mode, a separate thread to actively operate the component is not allocated, but the method or the event is processed via the reception thread of the component execution engine.

Figure 8:
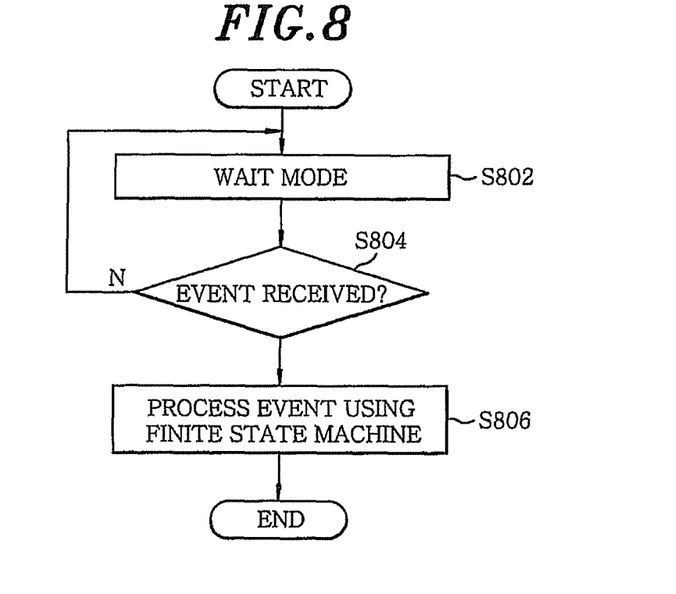
FIG. 8 illustrates a flowchart of a thread processing procedure on an event in a passive execution mode.

FIG. 8 illustrates a flowchart of a thread processing procedure on an event in a passive execution mode.

First, a robot software component is set to be a wait mode (step S802). During the wait mode, the reception thread of the component execution engine checks whether an event is received from the outside (step S804).

If it is determined in the step S804 that the event is received, the event is delivered to the processing unit of the component via the event port and processed by the reception thread via an FSM inside the processing unit (step S806). That is, the received event is not buffered before being processed.

Figure 9:
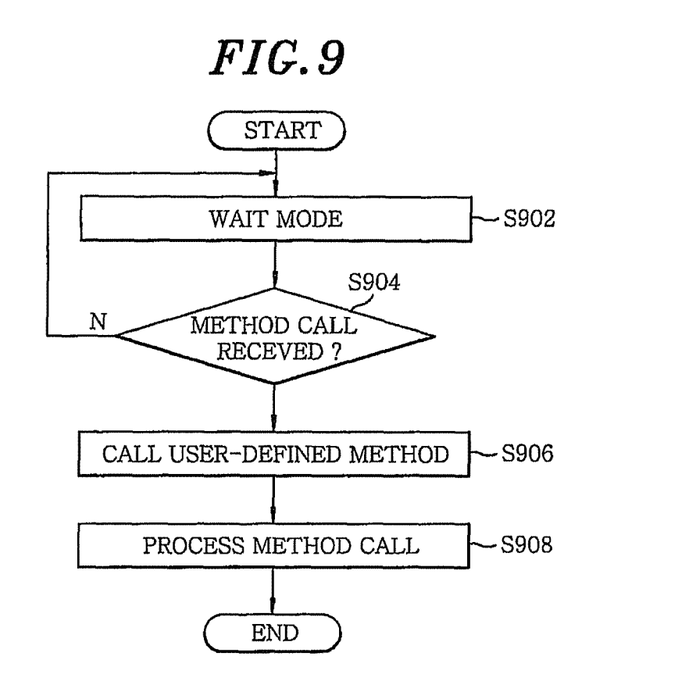
FIG. 9 illustrates a flowchart of a thread processing procedure on a method in a passive execution mode.

FIG. 9 illustrates a flowchart of a thread processing procedure on a method in a passive execution mode.

First, a robot software component is set to be a wait mode (step S902). During the wait mode, the reception thread of the component execution engine checks whether a method is requested from the outside (step S904).

If it is determined in the step S904 that the method is requested, the method request is delivered to the processing unit of the component via the method port and the reception thread calls a user-defined method, e.g., userDefinedMethod( ) (step S906).

Then, the reception thread processes the requested method by using thus called user-defined method (step S908).

In the passive execution mode, methods or events cannot be received while the reception thread of the component execution engine directly executes the component. In order to solve this problem, the reception thread may request and call a new thread for processing already received method or event. In this case, the reception thread may be still used to receive methods or events, and the new thread may be returned to the system after processing the method or event.

While the invention has been shown and described with respect to the embodiments, it will be understood by those skilled in the art that various changes and modification may be made without departing from the scope of the invention as defined in the following claims.

What is claimed is:

1. An apparatus for thread processing robot software components, the apparatus comprising:
a data port unit for, when an input data is inputted, storing the input data in a buffer and then processing the input data in a periodic execution mode or in a dedicated execution mode;
an event port unit for, when an input event is received, processing the input event in a passive execution mode; and
a method port unit for, when a method request is received by the method port unit, processing a requested method in the passive execution mode by calling a user-defined method corresponding to the requested method,
wherein, in said passive execution mode, using a finite State machine or a new created thread for processing the input event received or the method requested,
wherein, in said periodic execution mode, the input data is processed periodically by using a single execution thread according to a period and a priority of a corresponding component set in component setting information,
wherein, in said dedicated execution mode, the input data is processed by using a dedicated thread, dedicated to a corresponding component, such that the dedicated thread is suspended after being executed one time, and then re-executed when a resume method is called.

2. The apparatus of claim 1, wherein for the periodic execution mode, the period and a priority of the corresponding component are stored in component setting information.

3. The apparatus of claim 2, wherein in the periodic execution mode, components having an identical period and an identical priority are sequentially processed by using a single thread.

4. The apparatus of claim 2, wherein in the periodic execution mode, components having an identical period but different priorities are sequentially processed in an order of the priorities by using a single thread.

5. The apparatus of claim 1, wherein in the passive execution mode, the input event is processed by using a finite state machine.

6. The apparatus of claim 1, wherein in the passive execution mode, a new thread is requested to process the input event when a reception thread processes the input event.

7. The apparatus of claim 1, wherein in the passive execution mode, a new thread is requested to process the requested method when a reception thread processes the requested method.

8. A method for thread processing robot software components, the method comprising:
communicating with outside via a data port, an event port and a method port;
processing an input data received via the data port in a periodic execution mode or in a dedicated execution mode;
processing an input event received via the event port in a passive execution mode; and
processing a requested method call received via the method port in the passive execution mode by calling a user-defined method corresponding to the requested method,
wherein, in said passive execution mode, using a finite State machine or a new created thread for processing the input event received or the method requested,
wherein, in said periodic execution mode, the input data is processed periodically by using a singled execution thread according to a period and a priority of a corresponding component set in component setting information,
wherein, in said dedicated execution mode, the input data is processed by using a dedicated thread, dedicated to a corresponding component, such that the dedicated thread is suspended after being executed on time, and then re-executed when a resume method is called.

9. The method of claim 8, wherein for the periodic execution mode, the period and a priority of the corresponding component are stored in component setting information.

10. The method of claim 9, wherein in said processing the input data in the periodic execution mode, components having an identical period and an identical priority are sequentially processed by using a single thread.

11. The method of claim 9, wherein in said processing the input data in the periodic execution mode, components having an identical period are sorted in an order of priorities and sequentially processed in the order of the priorities by using a single thread.

12. The method of claim 11, wherein in said processing the input data in the periodic execution mode, an error is reported if the execution thread fails to process the input data according to the period of the corresponding component.

13. The method of claim 8, wherein in said processing the input data in the dedicated execution mode, the dedicated thread is suspended and waits for the resume method call by using a mutual exclusion object.

14. The method of claim 8, wherein in said processing the input event in the passive execution mode, the event is processed by using a finite state machine.

15. The method of claim 8, wherein in said processing the input event in the passive execution mode, a new thread is requested to process the input event when a reception thread processes the input event.

16. The method of claim 8, wherein in said processing the requested method in the passive mode, a new thread is requested to process the requested method when a reception thread processes the requested method.

17. The apparatus of claim 1, wherein configuration threads executing one of the robot software components are changed according to a port type of the component.

18. The method of claim 8, wherein configuration threads executing one of the robot software components are changed according to a port type of the component.

* * * * *